Dec. 1, 1931.  F. FRÉMAUX  1,834,054
SHOCK ABSORBER FOR VEHICLES
Filed Jan. 7, 1930
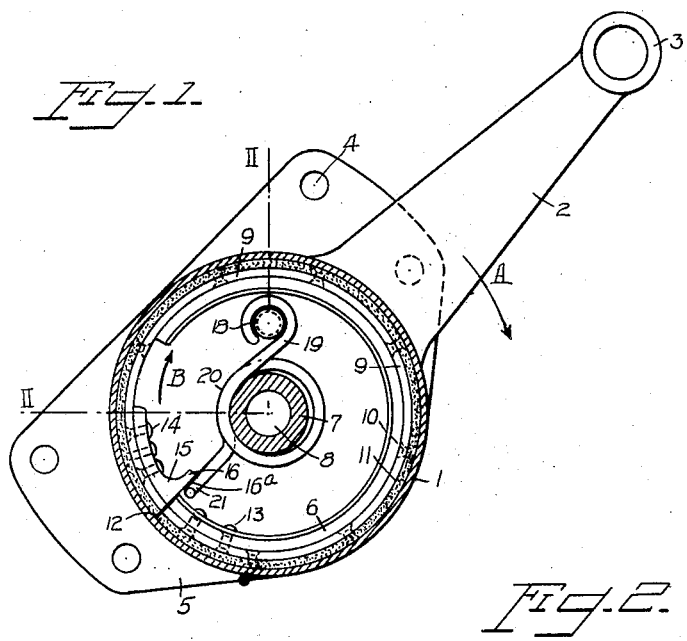
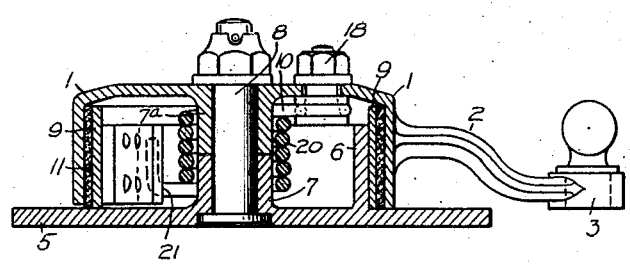
Ferdinand Frémaux
INVENTOR
BY
his ATTORNEY.

Patented Dec. 1, 1931

1,834,054

UNITED STATES PATENT OFFICE

FERDINAND FRÉMAUX, OF BRUSSELS, BELGIUM

SHOCK ABSORBER FOR VEHICLES

Application filed January 7, 1930, Serial No. 419,017, and in Belgium August 20, 1929.

This invention relates to shock absorbers for road vehicles or for any other industrial application, of the kind in which a friction band operates in a brake drum connected to an axle and adapted to rotate around a support or guide member fixed to the chassis of the vehicle.

It has for its object to prevent, in a shock absorber of the kind described, a sticking of the friction band and also to provide means whereby the intensity of the braking action may be controlled. A further object of the invention is to provide a simplified construction of shock absorber and thereby reduce the cost of manufacture to a considerable extent.

With this object in view, the invention essentially consists in the special arrangement and combinations of parts as hereinafter fully described and pointed out in the appended claims.

On the annexed drawings:

Fig. 1 is a sectional elevation of a shock absorber constructed in accordance with the invention.

Fig. 2 is a section on the line II—II of Figure 1, and

Fig. 3 is an elevation of a shock absorber.

As shown in Figure 1, the apparatus comprises a drum 1 having an arm 2 formed integrally therewith which is connected to the axle 3 of a vehicle. On the chassis of the vehicle is secured, by means of bolts passing into holes 4, a cheek or plate 5 formed with a curvilinear guide 6 and a tubular extension 7 contacting with an extension 7a formed on the drum 1. The cheek or plate 5 is connected to the drum 1 by a central bolt 8.

Within the drum 1 is arranged a flexible steel sheet or plate 9 on which is secured, by means of rivets 10, a friction band 11 which, like the sheet 9, is broken at 12. This band is secured at one end to the curvilinear guide 6 by means of rivets 13 whilst a shoe 15, terminating in a shoulder 16, is secured at its other end by rivets 14.

In the drum 1 is formed a controlling slot 17 (Figure 3) in which is fixed a bolt 18 the shank of which carries the end of a spring 19. This spring forms a spiral 20 around the extensions 7 and 7a of the cheek 5 and the drum 1 respectively and terminates in a flange 21 capable of contacting with the shoulder 16.

The shock absorber thus constructed functions in the following manner:

Assuming that the axle 3 tends to be displaced with respect to the chassis in the direction of the arrow A, the drum 1 also rotates or turns in the direction of this arrow. The result is that the bolt 18 which is arranged on this drum is carried with the movement of the latter. Moreover, by reason of the displacement of the drum 18 a pull is exerted on the spring 19 and the flange 21 for this reason exerts a pressure on the face 16a of the shoulder 16.

Under the action of this pressure the shoe is displaced in the direction of the arrow "B". As the steel sheet 9 is fixed at its opposite end to the guide 6 formed by the plate 5 and the friction band is fixed on this sheet, it will be understood that this sheet is expanded against the interior of the drum and that by reason of this expansion the desired braking effect is obtained.

As soon as the displacement of the arrow "A" is finished and the motive action causing the displacement of the shoe 15 and the expansion of the steel band has ceased to operate the spring is immediately released and in consequence the shoe 15 returns to its original position under the action of the elasticity of the sheet 9 which is automatically released so that any sticking thereof is prevented in an absolutely certain manner.

As will be easily understood, the intensity of the braking action depends on the force of the spring acting on the shoe and also on the position occupied by the bolt 18 in the slot 17. Moreover, the eventual wear of the friction band can be compensated owing to the possibility of displacing the bolt 18.

What I claim is:

1. In a shock absorber for vehicles, in combination with the chassis and the wheel axle of the vehicle, a fixed supporting member, the said member being provided with a tubular extension projecting from the said member, a circular drum provided with a central tubular extension, means whereby the drum is connected to the supporting member and is adapted to be rotated concentrically to the said extensions in case of a relative displacement between the chassis and the wheel axle, a friction band arranged inside the said drum, a flexible steel sheet in contact with the said friction band, and a spring fixed at one end to the said drum, and the other end of which is adapted to come into contact with one end of the said flexible steel sheet whereby in case of a relative movement of the axle with respect to the chassis, the flexible steel sheet is expanded by the spring against the interior of the drum and a braking action is obtained.

2. In a shock absorber for vehicles, in combination with the chassis and the wheel axle of the vehicle, a circular drum provided with a central tubular extension, a fixed supporting member for the said drum, the said member being provided with a tubular extension projecting from the said member, a bolt arranged inside the said extensions, whereby the drum is connected to the supporting member and is adapted to be rotated concentrically to the said extensions in case of a relative displacement between the chassis and the wheel axle, a friction band arranged inside the said drum, a flexible steel sheet in contact with the said friction band, means whereby the said flexible steel sheet and the friction band are connected together, a spring fixed at one end to the said drum, the said spring being spirally arranged around the said extensions and being adapted to come into contact by its other end with the end of the flexible steel sheet whereby in case of a relative movement of the axle with respect to the chassis the flexible steel sheet is expanded by the said spring against the interior of the drum and a braking action is secured.

3. In a shock absorber for vehicles, in combination with the chassis and the wheel axle of the vehicle, a circular drum provided with a central tubular extension, a fixed supporting member for the said drum, the said member being provided with a tubular extension projecting from the said member, means whereby the drum is connected to the supporting member and is adapted to be rotated concentrically to the said extensions in case of a relative displacement between the chassis and the wheel axle, a friction band arranged inside the said drum, a flexible steel sheet in contact with the said friction band, a shoe fixed on one end of the said flexible steel sheet, a spring fixed at one end to the drum, the said spring being spirally arranged around the said extensions and being adapted to come into contact with the said shoe whereby in case of a relative displacement of the axle with respect to the chassis, the flexible steel sheet is expanded by the said spring against the interior of the drum and a braking action is obtained.

4. In a shock absorber for vehicles, in combination with the chassis and the wheel axle of the vehicle, a circular drum provided with a central tubular extension, a fixed supporting member for the said drum, the said member being provided with a tubular extension projecting from the said member, means whereby the drum is connected to the supporting member and is adapted to be rotated concentrically to the said extensions in case of a relative displacement between the chassis and the wheel axle, a friction band arranged inside the said drum, a flexible steel sheet in contact with the said friction band, a spring adjustably fixed at one end in a slot of the drum, the said spring being spirally arranged around the said extensions and being adapted to come into contact by its other end with the end of the said flexible steel sheet whereby in case of a relative movement of the axle with respect to the chassis the flexible steel sheet is expanded by the said spring against the interior of the drum and a braking action is obtained.

5. In a shock absorber for vehicles, in combination with the chassis and the wheel axle of the vehicle, a circular drum provided with a central tubular extension, a fixed supporting drum for the said drum, the said member being provided with a tubular extension projecting from the said member, a bolt arranged inside the said extension whereby the drum is connected to the member and is adapted to be rotated concentrically to the said extensions in case of a relative displacement between the chassis and the wheel axle, a friction band arranged inside the said drum, a flexible steel sheet in contact with the said friction band, means whereby the friction band and the steel sheet are connected together, a shoe fixed on one end of the said flexible steel sheet, a spring adjustably fixed at one end in a slot of the drum, the said spring being spirally arranged around the said extensions and being adapted to come into contact by its other end with the said shoe whereby in case of a relative displacement of the axle with respect to the chassis, the flexible steel sheet is expanded by the said spring against the interior of the drum and a braking action is obtained, and means whereby the flexible steel sheet is guided in its movement.

In testimony whereof I have affixed my signature.

FERDINAND FREMAUX.